(12) United States Patent
Shi et al.

(10) Patent No.: US 9,100,164 B2
(45) Date of Patent: Aug. 4, 2015

(54) METHODS AND APPARATUSES IN A MOBILE COMMUNICATION NETWORK

(71) Applicant: Telefonaktiebolaget L M Ericsson (publ), Stockholm (SE)

(72) Inventors: Nianshan Shi, Järfälla (SE); Alessandro Caverni, Stockholm (SE); Waikwok Kwong, Solna (SE); Jose Luis Pradas, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 108 days.

(21) Appl. No.: 13/977,950

(22) PCT Filed: Jun. 18, 2013

(86) PCT No.: PCT/SE2013/050723
§ 371 (c)(1),
(2) Date: Jul. 2, 2013

(87) PCT Pub. No.: WO2014/051492
PCT Pub. Date: Apr. 3, 2014

(65) Prior Publication Data
US 2014/0086220 A1    Mar. 27, 2014

Related U.S. Application Data

(60) Provisional application No. 61/706,491, filed on Sep. 27, 2012.

(51) Int. Cl.
*H04L 5/00* (2006.01)
*H04L 25/03* (2006.01)
*H04L 27/26* (2006.01)

(52) U.S. Cl.
CPC .......... *H04L 5/0082* (2013.01); *H04L 27/2646* (2013.01); *H04L 27/2666* (2013.01); *H04L 2025/03764* (2013.01)

(58) Field of Classification Search
CPC .............. H04L 5/0082; H04L 27/2646; H04L 27/2666; H04L 2025/03764
See application file for complete search history.

(56) References Cited

U.S. PATENT DOCUMENTS 7,295,850 B2 * 11/2007 Pedersen ..................... 455/515
2005/0254511 A1   11/2005 Kekki
(Continued)

OTHER PUBLICATIONS

3GPP, "3rd Generation Partnership Project; Technical Specification Group Radio Access Network; UTRAN lub/lur interface user plane protocol for DCH data streams (Release 10)", 3GPP TS 25.427 V10.1.0, Jun. 2011, 1-46.
(Continued)

*Primary Examiner* — Luat Phung
*Assistant Examiner* — Kai Chang
(74) *Attorney, Agent, or Firm* — Murphy, Bilak & Homiller, PLLC (57) ABSTRACT

Techniques for supporting concurrent deployment of 2-millisecond and 10-millisecond TTI for E-DCH transmissions in CELL_FACH state and Idle Mode are disclosed. One example method comprises receiving a (310) transport block from a mobile terminal, wherein said transport block is transmitted using either a 10-millisecond or 2-millisecond TTI, and sending (320), to an RNC, an indication of whether data carried by the transport block was transmitted using the 10-millisecond TTI or the 2-millisecond TTI. In some embodiments, the indication is sent in a user plane frame sent over a base-station-to-RNC interface. A spare bit in an uplink data frame sent to the RNC may be used, for example.

16 Claims, 5 Drawing Sheets

(56) References Cited

U.S. PATENT DOCUMENTS

| | | | |
|---|---|---|---|
| 2006/0092876 A1* | 5/2006 | Kwak et al. | 370/329 |
| 2006/0176869 A1* | 8/2006 | Cheng et al. | 370/345 |
| 2007/0109964 A1* | 5/2007 | Kwak et al. | 370/230 |
| 2009/0168704 A1* | 7/2009 | Lee et al. | 370/329 |
| 2009/0175232 A1* | 7/2009 | Kolding | 370/329 |
| 2009/0259909 A1* | 10/2009 | Luo | 714/748 |
| 2010/0238829 A1* | 9/2010 | Sambhwani et al. | 370/252 |
| 2012/0039294 A1* | 2/2012 | Yan et al. | 370/329 |
| 2012/0044798 A1* | 2/2012 | Yan et al. | 370/216 |
| 2013/0155974 A1* | 6/2013 | Papasakellariou et al. | 370/329 |
| 2013/0208668 A1* | 8/2013 | Ramos et al. | 370/329 |
| 2013/0336236 A1* | 12/2013 | Brus et al. | 370/329 |
| 2014/0133471 A1* | 5/2014 | Nammi et al. | 370/336 |
| 2014/0362832 A1* | 12/2014 | Rudolf et al. | 370/336 |

OTHER PUBLICATIONS

3rd Generation Partnership Project. 3GPP TS 25.423 V11.3.0 (Sep. 2012). 3rd Generation Partnership Project; Technical Specification Group Radio Access Network; UTRAN Iur interface Radio Network Subsystem Application Part (RNSAP) signalling (Release 11). Sep. 2012, pp. 1-1165.

3rd Generation Partnership Project.3GPP TS 25.425 V10.2.0 (Dec. 2011). 3rd Generation Partnership Project; Technical Specification Group Radio Access Network; UTRAN Iur interface user plane protocols for Common Transport Channel data streams (Release 10). Dec. 2011, pp. 1-49.

3rd Generation Partnership Project. 3GPP TS 25.433 V11.2.0 (Sep. 2010). 3rd Generation Partnership Project; Technical Specification Group Radio Access Network; UTRAN Iub interface Node B Application Part (NBAP) signalling (Release 11). Sep. 2012, pp. 1-1293.

3rd Generation Partnership Project. 3GPP TS 25.435 V10.4.0 (Dec. 2011). 3rd Generation Partnership Project; Technical Specification Group Radio Access Network; UTRAN Iub interface user plane protocols for Common Transport Channel data streams (Release 10). Dec. 2011, pp. 1-61.

Unknown, Author, "Considerations on the open issues for 2ms and 10ms concurrent deployment in CELL FACH state", Huawei, HiSilicon. R2-121809. 3GPP TSG RAN WG2 #77bis, Jeju, Korea, Mar. 26-30, 2012. 1-3.

Unknown, Author, "Introduction of Further Enhancements to CELL_FACH feature", Change Request. Huawei, Ericsson. R3-122879. 3GPP TSG-RAN3, Meeting #78, New Orleans, Nov. 12-16, 2012. 1-8.

* cited by examiner

METHODS AND APPARATUSES IN A MOBILE COMMUNICATION NETWORK

TECHNICAL FIELD

The present disclosure is generally related to wireless communications networks, and is more particularly related to techniques for facilitating the use of multiple transmit-time intervals in such networks.

BACKGROUND

The $3^{rd}$-Generation Partnership Project (3GPP) is continuing development of the specifications for the Universal Terrestrial Radio Access Network (UTRAN). More particularly, work is ongoing to improve the end-user experience and performance in Release 11 of those specifications. These efforts include work to improve end-user experience and system performance in the CELL_FACH state, as part of a 3GPP Work Item called "Further Enhancements to CELL_FACH."

CELL_FACH is a Radio Resource Control (RRC) state in which the end-user terminal (user equipment, or UE, in 3GPP terminology) is known to the network at the cell level (i.e., it has a cell ID) and has a layer 2 connection, but has no dedicated physical layer resources. Instead, the UE in CELL_FACH state must share common physical layer resources with other users in CELL_FACH state.

The Enhanced Dedicated Channel (E-DCH), which is an uplink packet-access channel, can be deployed so that it may be used by UEs in CELL_FACH state. More usually, E-DCH is used as a dedicated channel in CELL_DCH state, in which case a separate resource is allocated for each user. When E-DCH is used in CELL_FACH state, however, the system uses a pool of E-DCH resources that can each be temporarily assigned to a UE in CELL_FACH state.

This common pool of E-DCH resources is referred to herein as "common E-DCH resources." E-DCH resources are normally managed by the Radio Network Controller (RNC), but the pool of common E-DCH resources is instead managed by the Node B (3GPP terminology for a base station). Configuration data specifying the E-DCH configurations are broadcasted to UEs in the cell.

A common E-DCH resource is defined as a particular combination of the following: an uplink scrambling code; an E-DCH Radio Network Temporary Identifier (E-RNTI); an F-DPCH code and timing offset; E-AGCH/E-RGCH/E-HICH codes and signatures; and parameters for use by the UE in uplink High-Speed Dedicated Physical Control Channel (HS-DPCCH) transmissions, such as power offsets and Channel Quality Report configuration information.

As of Release 10 of the 3GPP standards, the CELL_FACH state is commonly used to provide an efficient use of radio resources for UEs when data is arriving in bursts, with longer idle periods in between. The goals include both an efficient use of the UE's limited battery resources, as well as an efficient use of the network's radio resources. Ideally, an UE should be inactive between the bursts but should still be capable of swiftly moving into an active state when there are packets to send or receive. For this type of on-off traffic, the connection set-up latency and signaling load has a significant impact both on the preservation of the device battery and on the transmission quality perceived by the end user. In dormant periods, UEs are either sent to Idle state or are set to use configured Discontinuous Receive (DRX) schemes, to save battery energy.

Information specifying E-DCH resource configurations is broadcasted to UEs using SIB 5, which is a system information block sent over the BCH. Some of the broadcasted parameters, such as the Transmission Time Interval (TTI), are common for all common E-DCH resources.

The specifications for E-DCH as of Release 10 of the 3GPP specifications are rather rigid and do not allow flexible configurations. One example is the Transmission Time Interval (TTI) for common E-DCH resources. Currently, two different TTIs may be configured: either a 10-millisecond TTI or a 2-millisecond TTI may be configured. However, for coverage reasons, the network is likely to have some common E-DCH resources configured with a 10-millisecond TTI. As specified today, this implies that all resources must the same TTI. However, UEs in good radio conditions, e.g., in so-called hot spots, could make good use of common E-DCH resource with the shorter (2-millisecond) TTI. A shorter TTI improves both uplink throughput and network capacity, since each resource is occupied for less time. Concurrent deployment of 2-millisecond and 10-millisecond TTIs will thus provide the network with the flexibility to make an effective and optimal utilization of the common E-DCH resources.

Accordingly, as part of the 3GPP Release 11 Work Item "Further Enhancements to CELL_FACH," 3GPP has decided to introduce support for concurrent deployment of 2-millisecond and 10-millisecond TTIs in a cell, for E-DCH transmission in CELL_FACH state and Idle Mode. According to the initial proposals, a requirement relating to UE power headroom is broadcast in a cell. UEs that fulfill the requirement will use the common E-DCH with a 2-millisecond TTI, while those not fulfilling the requirement will use the common E-DCH with a 10-millisecond TTI.

While concurrent deployment 2-millisecond and 10-millisecond TTI in a cell for E-DCH transmission in CELL_FACH state and Idle Mode offers opportunities for improved utilization of E-DCH resources, further improvements to network procedures and signaling are needed to take full advantage of these opportunities.

SUMMARY

As noted above, future releases of the 3GPP standards for UTRAN will provide support for concurrent deployment of 2-millisecond and 10-millisecond TTI in a cell for E-DCH transmissions in CELL_FACH state and Idle Mode. In the current 3GPP specifications, i.e., Release 10, when E-DCH resources are used in the CELL_DCH or CELL_FACH state, it is the RNC that determines whether a user or a cell should operate on 2-millisecond TTI or 10-millisecond TTI and configures the UE and Node B accordingly. On the other hand, when 2-millisecond TTI and 10-millisecond TTI are concurrently deployed for CELL_FACH use in future releases, it will be the UE that selects the TTI.

Accordingly, the RNC will not be aware of whether any particular UE is using the 10-millisecond or 2-millisecond TTI resources for CELL_FACH. However, the RNC can benefit from knowing whether data sent on common E-DCH resource are transmitted on 2-millisecond TTI or 10-millisecond TTI, e.g., so that it can efficiently allocate resources such as internal buffers and link bandwidths.

Embodiments of the presently disclosed techniques address this problem. These embodiments include several methods suitable for implementation by a base station of a mobile communication network. One example method comprises receiving a transport block from a mobile terminal, wherein said transport block is transmitted using either a 10-millisecond or 2-millisecond TTI, and sending, to an RNC, an indication of whether data carried by the transport block was transmitted using the 10-millisecond TTI or the 2-millisecond TTI. In some embodiments, the indication is sent in a user plane frame sent over a base-station-to-RNC interface. A spare bit in an uplink data frame sent to the RNC may be used, for example.

Corresponding methods carried out by an RNC of a mobile communication network are also disclosed. One example method comprises receiving data from a transport block transmitted to a base station by a mobile terminal, where the transport block was transmitted using either a 10-millisecond or 2-millisecond TTI, and receiving an indication of whether the data carried by the transport block was transmitted using the 10-millisecond TTI or the 2-millisecond TTI. In some embodiments, the indication is received in a user plane frame sent to the RNC by the base station, over a base-station-to-RNC interface. In other embodiments or in other instances, the indication is received in a user plane frame sent to the RNC by another RNC, over an RNC-to-RNC interface. The indication may be received in at least one spare bit of an uplink data frame, in some embodiments.

Other embodiments include base station apparatus and RNC apparatus adapted to carry out one or more of the techniques summarized above and/or any of the variant techniques described below. Of course, the techniques, systems, and apparatus described herein are not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
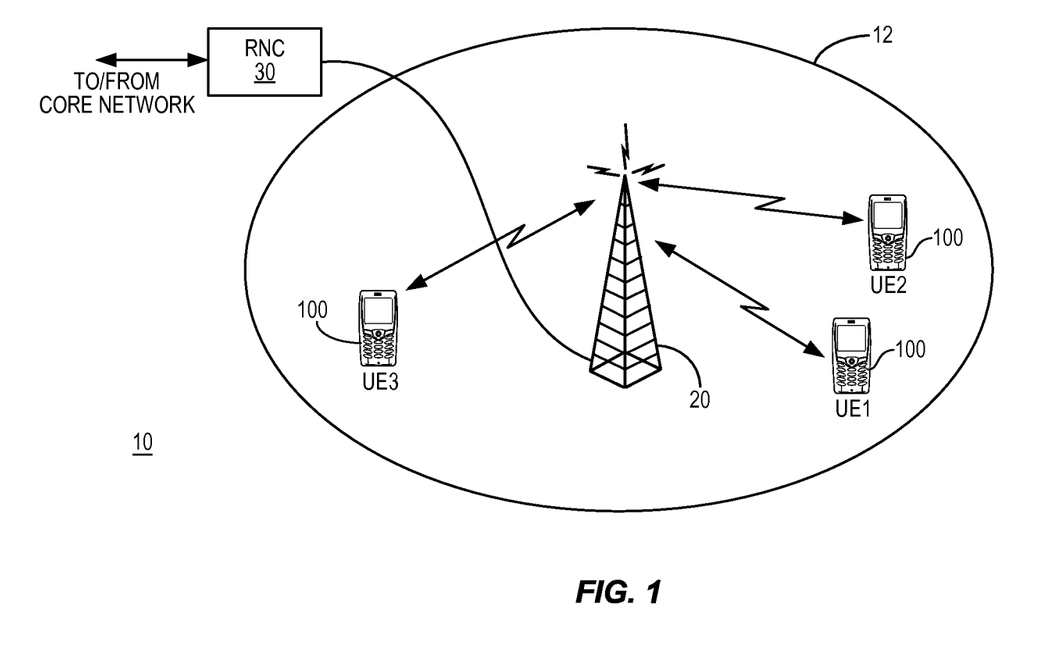
FIG. 1 illustrates a wireless network including a base station, one or more mobile terminals, and an RNC.

Referring now to the drawings, FIG. 1 illustrates an exemplary mobile communication network 10 for providing wireless communication services to mobile terminals 100. Three mobile terminals 100, which are referred to as "user equipment" or "UE" in 3GPP terminology, are shown in FIG. 1. The mobile terminals 100 may comprise, for example, cellular telephones, personal digital assistants, smart phones, laptop computers, handheld computers, or other devices with wireless communication capabilities. It should be noted that the term "mobile terminal," as used herein, refers to a terminal operating in a mobile communication network and does not necessarily imply that the terminal itself is mobile or movable. Thus, the term may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is referred to in the UTRAN context as a Node B. One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

In a UTRAN system, base station 20 is connected to a Radio Network Controller (RNC) 30 over the Iub interface. The RNC 30 is in turn connected to the core network via both a circuit-switched interface (known as the Iu-CS interface) and a packet-switched interface (known as the Iu-PS interface). Further, RNC 30 may be connected to other RNCs over an Iur interface. Among other things, the RNC 30 controls one or several Node B's, performing radio resource management and mobility management functions.

For illustrative purposes, several embodiments of the present invention will be described in the context of a UTRAN system. Those skilled in the art will appreciate, however, that several embodiments of the present invention may be more generally applicable to other wireless communication systems.

As noted above, future releases of the 3GPP standards for UTRAN will provide support for concurrent deployment of 2-millisecond and 10-millisecond TTI in a cell for E-DCH transmissions in CELL_FACH state and Idle Mode. The Node B in a given cell will broadcast a requirement related to UE power headroom. UEs that meet the requirement will use the common E-DCH resources with a 2-millisecond TTI and those not fulfilling the requirement will instead use the common E-DCH with a 10-millisecond TTI.

In the current 3GPP specifications, i.e., Release 10, when E-DCH resources are used in the CELL_DCH or CELL_FACH state, it is the RNC that determines whether a user or a cell should operate on 2-millisecond TTI or 10-millisecond TTI and configures the UE and Node B accordingly. On the other hand, when 2-millisecond TTI and 10-millisecond TTI are concurrently deployed for CELL_FACH use in future releases, it will be the UE that selects the TTI.

Under the current plans, the RNC will not be aware of whether any particular UE is using the 10-millisecond or 2-millisecond TTI resources for CELL_FACH. However, the RNC can benefit from knowing whether data sent on common E-DCH resource are transmitted on 2-millisecond TTI or 10-millisecond TTI, for several different reasons. First, the resources used to handle the uplink data may need to be allocated differently for the two TTIs, because of the different rates and different block sizes associated with the two TTIs. The resources affected may include the memory for the various internal buffers and the bandwidth requirements for the Iub link and other RNC-internal links and bearers, for example. The RNC, therefore, can use this information to better allocate these resources, so the uplink data can be transferred to the upper layer in an efficient way. Furthermore, the RNC can use the information to estimate the relative utilization between the two TTIs. This allows the RNC to dynamically manage the resources that should be allocated to common E-DCH resources in the cell, e.g., by adjusting the size of the pool of common resources, or the index allocation in the pool.

When the Node B receives a transport block from a UE, it knows whether the common E-DCH data is transmitted on 2 ms TTI or 10 ms TTI. (The interface between the Node B and the UE, which includes the radio interface, is known as the Uu interface.) According to several embodiments of the present invention, then, the Node B then indicates to the RNC whether the data was transmitted using the 2-millisecond TTI or 10-millisecond TTI. In various embodiments, this indication may be sent via either the Iub/Iur user plane protocol or the NBAP/RNSAP control plane protocol.

The RNC uses this information to transfer the data sent by the UE to upper layers. The RNC may also use this information to get an overview of how the common E-DCH resources are utilized in the cells, to estimate the relative utilization between the two TTIs, and to dynamically manage the resources needed for common E-DCH in the cell.

A TTI-length indicator is thus introduced for the Node B to notify the RNC whether particular uplink data has been transmitted by the UE on a common E-DCH that is configured for 2-millisecond TTI or for 10-millisecond. In some embodiments, when the Node B receives a transport block over the Uu interface and packages it into an Iub user plane frame, for relaying to the RNC, the Node B also includes this TTI-length indicator in the Iub user plane frame. Alternatively, a stand-alone TTI-length indicator can be used, in some embodiments. In this case, the Node B uses the stand-alone TTI-length indicator to notify the RNC whether a certain UE is or will be transmitting in the CELL_FACH state using 2-millisecond TTI or 10-millisecond TTI in the CELL_FACH state.

Several possible approaches for signaling the TTI-length indicator are detailed below. These approaches are based on various modifications of the signaling between a Node B and a RNC. Those familiar with signaling in the UTRAN system will be aware that signaling between a Serving Radio Network Controller (SRNC) and a Node B is sent over the Iub interface, while signaling between the SRNC and a Drifting Radio Network Subsystem (DRNS) takes place over the Iur interface. In the below discussions, various modifications to Radio Network Subsystem Application Part (RNSAP) protocol messages, Node B Application Part (NBAP) protocol messages, and User Plane Frame Protocol frames are described.

A current definition of the User Plane Frame Protocol (UP Protocol) for the Iub interface is provided in the 3GPP documents 3GPP TS 25.435, v. 10.2.0, and 3GPP TS 25.427, v. 10.1.0, which are available at www.3gpp.org. Corresponding structures in the user plane protocols for the UTRAN Iur interface can be found in 3GPP TS 25.425, v. 10.2.0, also available at www.3gpp.org. NBAP is defined in 3GPP TS 25.433, v. 10.7.0, while RNSAP is defined in 3GPP TS 25.423, v. 10.8.0.

Solution A.

With this approach, the content of the existing "Iub/Iur Uplink E-DCH Data Frame for CELL_FACH and Idle State" is extended to include an indication of whether the data received from the mobile terminal was transmitted using the 10-millisecond TTI or the 2-millisecond TTI. A spare bit or bits of the uplink Iub/Iur data frame protocol, e.g., in the header, in a spare extension, or in other spare positions, is used to carry the TTI-length indicator.

Figure 2:
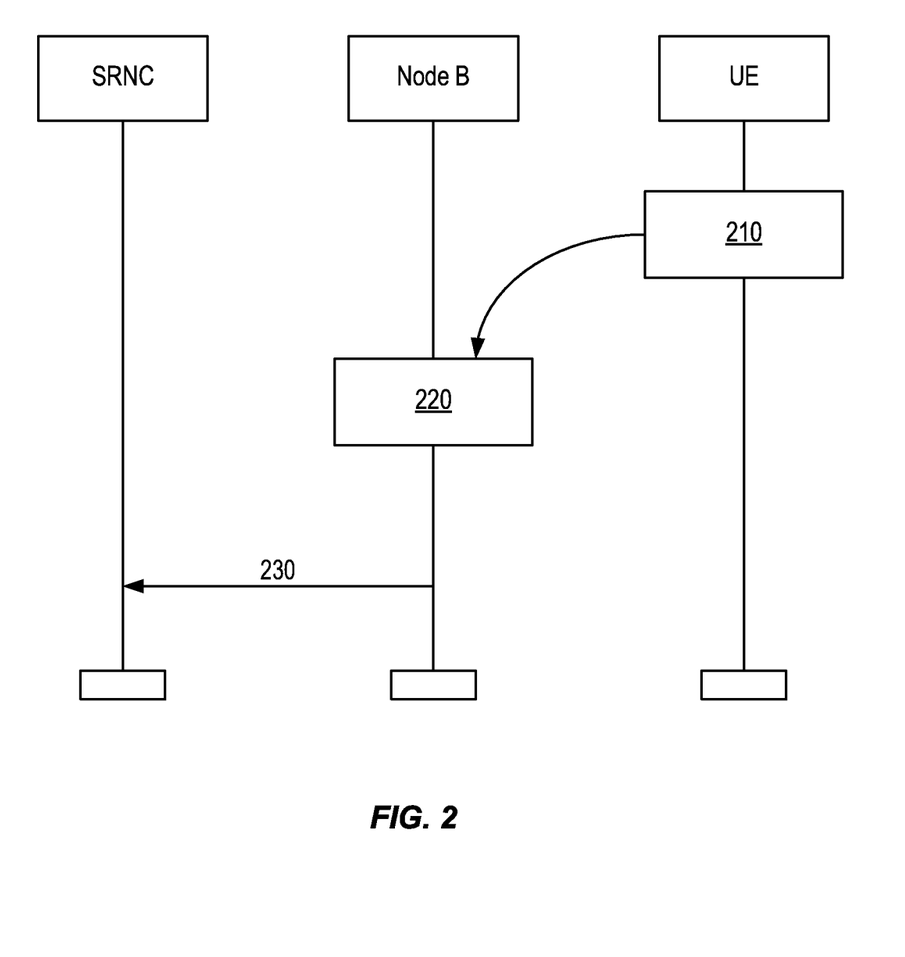
FIGS. 2 and 3 illustrate one example method for indicating a TTI length for common E-DCH transmissions.

This approach is illustrated in FIG. 2, which shows the communication between a UE, a Node B, and the RNC when the TTI-length indicator is introduced. At block 210, the UE is using common E-DCH resources for CELL_FACH, and is transmitting using either a 2-millisecond TTI or a 10-millisecond TTI. At block 220, the NodeB receives the transmission, and knows which of the two possible TTIs is being used. At 230, the NodeB sends an indication of the TTI length to the Serving RNC (SRNC). This may be done with a new or existing NBAP control plane message, for example—the control plane message should include a length indicator specifying whether the 2-millisecond or 10-millisecond TTI is used, as well as a UE identifier, such as an H-RNTI. Alternatively, the length indicator may be sent to the RNC by extending the uplink data frame sent to the RNC with a 2-millisecond/10-millisecond TTI length indicator.

Figure 5:
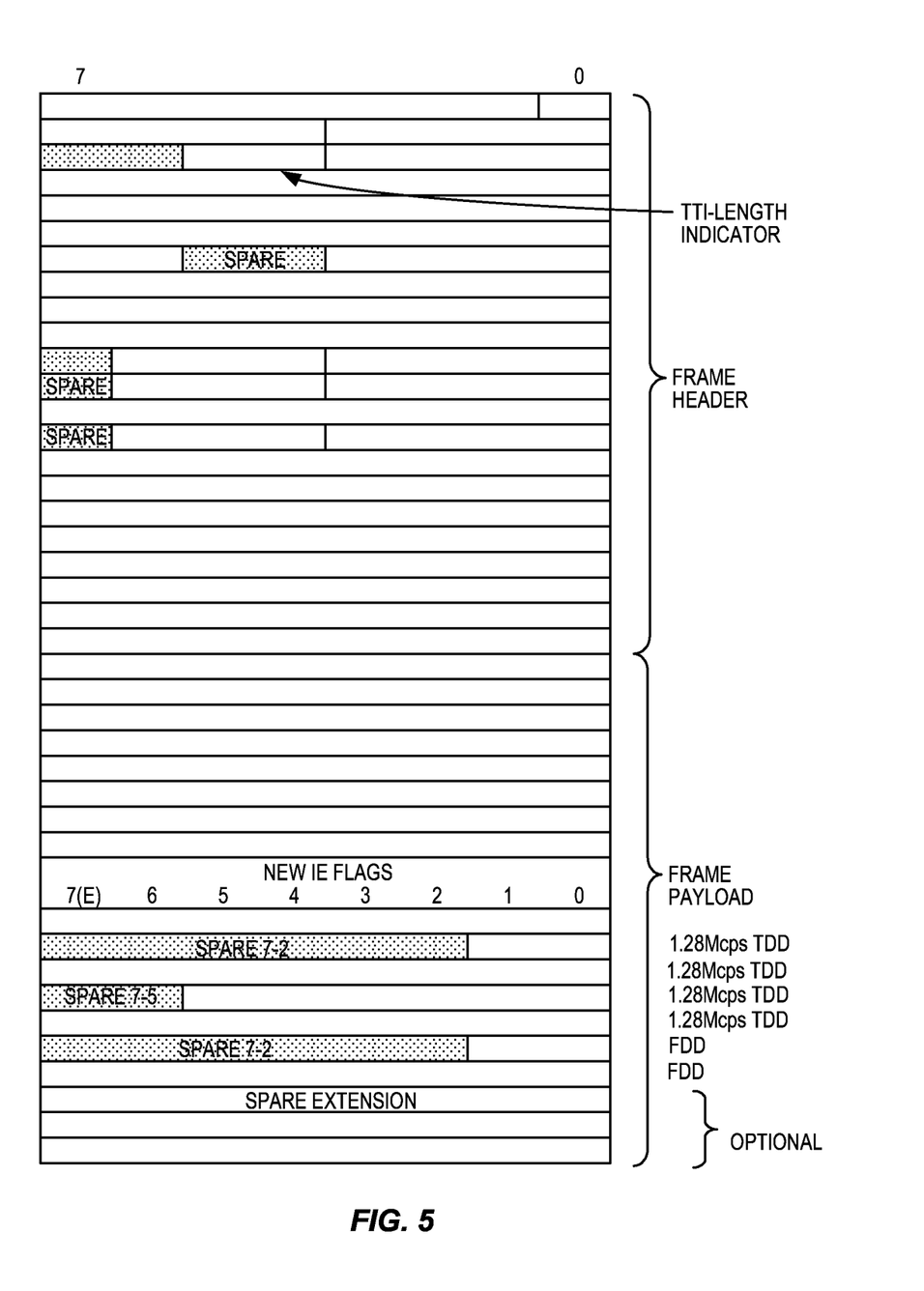
FIG. 5 illustrates the structure of an example E-DCH Data Frame for CELL_FACH and Idle states, as adapted for carrying an indication of TTI length.

An example packaging of the TTI-length indicator into an E-DCH Data Frame structure for CELL_FACH and Idle states, which carries user plane data from the Node B to the RNC is illustrated in FIG. 5. In the illustrated example, two of the four spare bits in the third octet of the frame header are used to carry the TTI-length indicator. This is one example; other spare bits could be used instead.

An example of the details of the new indicator information element (IE) follows:

New IE:
    Field name: TTI-Length Indication
    Description: Indicates whether the data is transmitted in 2 ms TTI or 10 ms TTI.
    Value range:

| 0 | Not relevant |
|---|---|
| 1 | 2 ms TTI |
| 2 | 10 ms TTI |
| 3 | Reserved |

Field length: 2 bit

Other examples of the IE format and the mapping of the values to TTI lengths are possible, of course. For instance, the IE may comprise only a 1-bit field for indicating TTI length, where the value 0 indicates a 2-millisecond TTI and the value 1 indicates a 10-millisecond TTI.

In another example, a bit in the spare extension of the frame payload is allocated as the new indicator (for example called TTI-Length Indication). A bit in the New IE Flags may be defined. For example in the current 3GPP specification "UTRAN Iub interface user plane protocols for Common Transport Channel data streams," 3GPP TS 25.435, v. 10.4.0 (December 2012), bit 1 in the New IE Flags is not used. In some embodiments of the present invention, this bit is used as a TTI-Length Indicator. Thus, bit 1 of New IE Flags IE in E-DCH DATA FRAME indicates if TTI-Length Indication IE is present (1) or not present (0); this new IE may be described as follows:

New IE:
    Field name: TTI-Length Indication
    Description: Indicates whether the data is transmitted in 2 ms TTI or 10 ms TTI.
    Value range:

| 0 | 2 ms TTI |
|---|---|
| 1 | 10 ms TTI |

Field length: 1 bit

In another example, two bits may be allocated from the spare bits in the Frame Header. One bit is defined as a flag, indicating whether the TTI-Length Indication is presented or not. When it is set to 1, the TTI-Length Indication will be used.

In another example, when the data is transmitted using a 2-millisecond TTI, the Subframe Number can be any value from 0 to 4. When the data is transmitted using a 10-millisecond TTI, the Subframe Number is 0. The RNC can first try to detect whether the data is transmitted on a 2-millisecond TTI by using the existing Subframe Number IE, when more than one subframe is included. With this approach, the RNC will use the signaling method described above to solve the ambiguity of the TTI length when only one Subframe Number is included.

In still another example, the existing Subframe Number is redefined, to eliminate any ambiguities. For example the Subframe Number for 10-millisecond TTI is set to 0, while the Subframe Number for a 2-millisecond TTI is set to a range that does not include zero, e.g., 1 to 4. However, this approach will change the meaning of the IE relative to previous releases of the specifications and will not be backwards compatible.

Solution B.

With this approach, a Iub/Iur uplink control frame is used to transfer the information. A spare bit or bits in the existing uplink Iub/Iur frame protocol, e.g., in the header, spare extension, or other spare positions, is used to carry the TTI-length indicator and the UE identity (e.g. H-RNTI/E-RNTI) of the UE. Alternatively, instead of modifying an existing control frame, a new control frame can be introduced to carry this information. In this case, the control frame can be transmitted ahead of the data frames, to inform the RNC in advance of the TTI length used for the data to follow.

Solution C.

With this approach, an NBAP/RNSAP message is sent from the Node B to the RNC, carrying the TTI-length indicator and the identity of the UE (e.g., the H-RNTI/E-RNTI). A new NBAP/RNSAP message can be introduced for this purpose or an existing one can be extended to include the new information. This message can then be transmitted ahead of any data transmissions for the same user to inform the RNC of the TTI length being used.

Solution D.

Two new data frames can be defined, one for E-DCH Data Frame for CELL_FACH and Idle when using 2-millisecond TTI, and another for E-DCH Data Frame for CELL_FACH and Idle when using 10-millisecond TTI. This way, no further indication is needed.

Note that where solutions are proposed above for NBAP/Iub frame protocols, i.e., for signaling between the Node B and an RNC, similar solutions may be applied to the RNSAP/Iur frame protocols, for signaling between RNCs. It should also be noted that in the current 3GPP specification, UEs in CELL_FACH or Idle state do not have dedicated Radio Resources, and are therefore not managed by a dedicated Radio Link handling procedure. On the other hand, the user plane is always used for the data transfer. To minimize the impact on the 3GPP standard, then, it is preferable to introduce the TTI-length indicator discussed above in the user-plane protocol.

Embodiments of the present invention include methods for carrying out any one or more of the solutions described above, as implemented in either a Node B or an RNC. In a first category of these methods, a first node, such as a Node B, determines whether a UE is using a 2-millisecond TTI or a 10-millisecond for transmitting a transport block (in CELL_FACH state), and sends a TTI-length indicator to a second node, such as an RNC. Any of the above-described techniques for signaling the TTI-length indicator may be used. In a second category of these methods, a second node, such as an RNC, receives a TTI-length indicator from a first node, such as a Node B. The TTI-length indicator indicates whether a particular UE is using 2-millisecond or 10-millisecond TTIs for CELL_FACH mode, or whether a particular transport block has been sent using a 2-millisecond TTI or a 10-millisecond TTI. The RNC then applies this information in relating data from the corresponding UE to upper layers and/or in making resource allocation decisions regarding common E-DCH resources.

Figure 3:
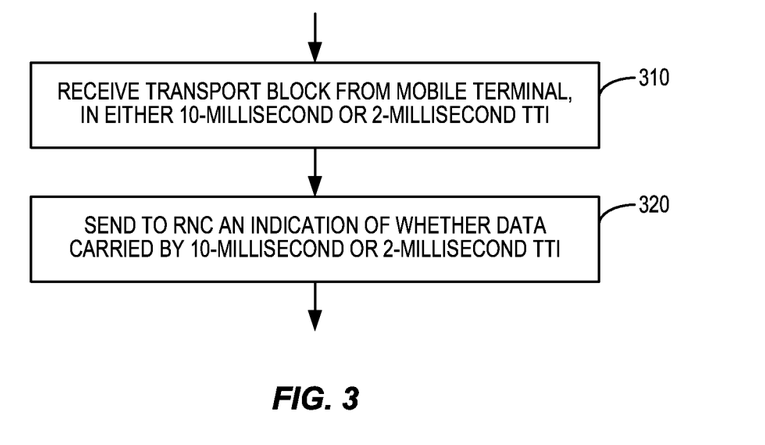

FIG. 3 is a process flow diagram illustrating an example method according to the first category, and shows a method that can be implemented in a base station of a mobile communication network. As shown at block 310, the method begins with receiving a transport block from a mobile terminal, where the transport block is transmitted using either a 10-millisecond or 2-millisecond TTI. The method continues, as shown at block 320, with sending, to an RNC, an indication of whether data carried by the transport block was transmitted using the 10-millisecond TTI or the 2-millisecond TTI.

In some embodiments, as discussed above, the indication is sent in a user plane frame sent over a base-station-to-RNC interface. This may be done, for example, by using at least one spare bit in an uplink data frame sent to the RNC. In some of these embodiments, the user plane frame comprises a first bit indicating that a TTI-length information length element is present in the user plane frame, and the TTI-length information length element comprises a second bit indicating whether the data was transmitted using the 10-millisecond TTI or the 2-millisecond TTI. It will be appreciated that these bits may be in different parts of the user plane frame.

Figure 4:
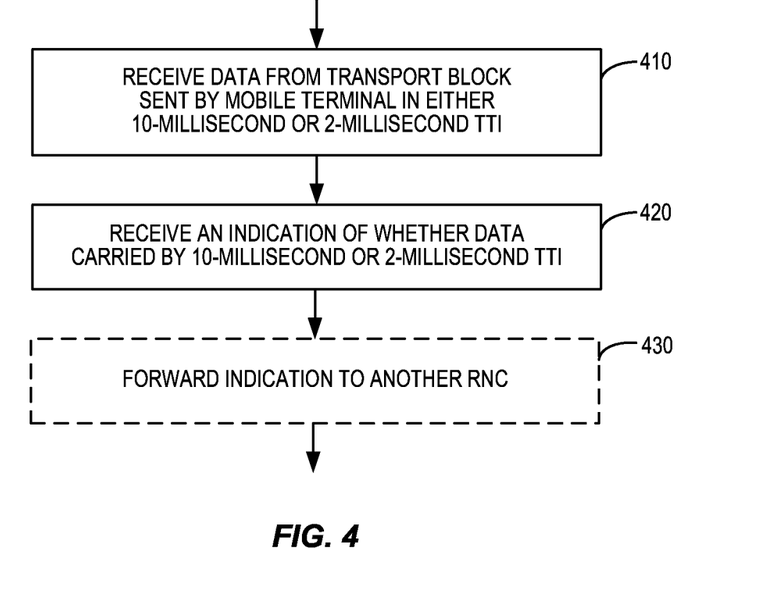
FIG. 4 illustrates a corresponding method for receiving an indication of TTI length for common E-DCH transmissions.

FIG. 4 is another process flow diagram illustrating a corresponding method that can be implemented in a RNC of the mobile communication network. As shown at block 410, the method illustrated in FIG. 4 begins with receiving data from a transport block transmitted to a base station by a mobile terminal, where said transport block was transmitted using either a 10-millisecond or 2-millisecond TTI. As seen at block 420, this method continues with receiving an indication of whether the data carried by the transport block was transmitted using the 10-millisecond TTI or the 2-millisecond TTI. The indication may be received in a user plane frame sent to the RNC by the base station, over a base-station-to-RNC interface, for example. Likewise, the indication may be received in a user plane frame sent to the RNC by another RNC, over an RNC-to-RNC interface. In either case, the indication may be received in at least one spare bit of the uplink data frame, in some embodiments. In some embodiments, the user plane frame comprises a first bit indicating that a TTI-length information length element is present in the plane frame, and the TTI-length information length element comprises at least a second bit indicating whether the data was transmitted using the 10-millisecond TTI or the 2-millisecond TTI.

In some embodiments and/or under certain circumstances (e.g., when the method is carried out by an RNC acting as a Drift RNC), the method may further include forwarding the indication of whether data carried by the transport block was transmitted using the 10-millisecond TTI or the 2-millisecond TTI to a second RNC. This is shown at block 430, which is pictured with a dashed outline to indicate that this operation is "optional" in the sense that it may not appear in all embodiments or in all instances when the rest of the method is carried out.

Those skilled in the art will appreciate that the methods described may be used in combination with each other. Further, each of the techniques and the methods described above can be implemented in one or more of several network nodes, such as a Radio Network Controller (RNC) or a Node B, as appropriate for any given technique.

Figure 6:
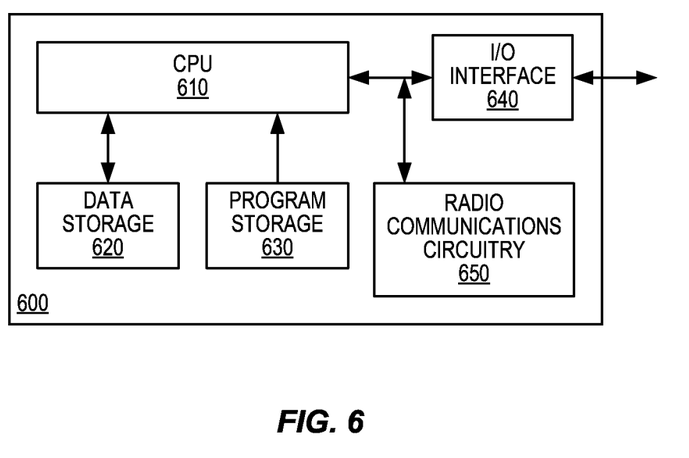
FIG. 6 is a block diagram illustrating functional elements of an example node according to some embodiments of the invention.

FIG. 6 is a schematic illustration of an example base station apparatus 600, in which a method embodying one or more of the above-described techniques can be implemented. A computer program for controlling the base station to carry out a method embodying the present invention is stored in a program storage 630, which comprises one or several memory devices. Data used during the performance of a method embodying the present techniques is stored in a data storage 620, which also comprises one or more memory devices. During performance of a method embodying the present techniques, program steps are fetched from the program storage 630 and executed by a Central Processing Unit (CPU) 610, which retrieves data as required from the data storage 620. Output information resulting from performance of a method embodying the present invention can be stored back in the data storage 620, or sent to an Input/Output (I/O) interface 640, which may comprise a transmitter for transmitting data to other nodes, such as an RNC, as required. Likewise, the Input/Output (I/O) interface 640 may comprise a receiver for receiving data from other nodes, for example for use by the CPU 610. Of course, base station 600 further comprises radio communications circuitry 650, which is adapted according to well-known designs and techniques to communicate with one or more mobile terminals. According to several embodiments of the present invention, base station apparatus 600 is adapted to receive a transport block from a mobile terminal, where said transport block is transmitted using either a 10-millisecond or 2-millisecond TTI, and to send, to an RNC, an indication of whether data carried by the transport block was transmitted using the 10-millisecond TTI or the 2-millisecond TTI.

Figure 7:
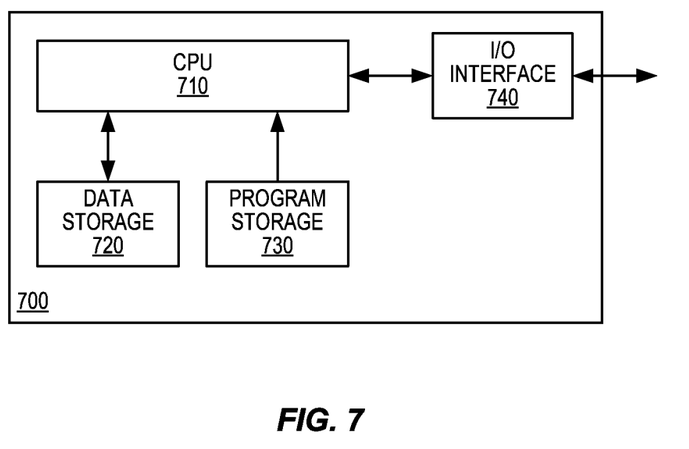
FIG. 7 is a block diagram illustrating functional elements of another example node according to some embodiments of the invention.

Similarly, FIG. 7 is a schematic illustration of an example RNC 700 in which a method embodying one or more of the above-described techniques can be implemented. Again, a computer program for controlling the RNC to carry out a method embodying the present invention is stored in a program storage 730, which comprises one or several memory devices. Data used during the performance of a method embodying the present techniques is stored in a data storage 720, which also comprises one or more memory devices. During performance of a method embodying the present techniques, program steps are fetched from the program storage 730 and executed by a Central Processing Unit (CPU) 710, which retrieves data as required from the data storage 720. Output information resulting from performance of a method embodying the present invention can be stored back in the data storage 720, or sent to an Input/Output (I/O) interface 740, which may comprise a transmitter for transmitting data to other nodes, such as to a base station, another RNC, or to the core network, as required. Likewise, the Input/Output (I/O) interface 740 may comprise a receiver for receiving data from other nodes, for example for use by the CPU 710. According to several embodiments of the invention, RNC 700 is adapted to receive data from a transport block transmitted to a base station by a mobile terminal, where the transport block was transmitted using either a 10-millisecond or 2-millisecond TTI, and to receive an indication of whether the data carried by the transport block was transmitted using the 10-millisecond TTI or the 2-millisecond TTI.

Accordingly, in various embodiments of the invention, processing circuits, such as the CPU 610 in FIG. 6 and the CPU 710 in FIG. 7, are configured, along with supporting memory devices and other circuitry, to carry out one or more of the techniques described in detail above. Likewise, other embodiments include base stations and/or radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

With the embodiments described above, there are several tangible advantages. First, these techniques and devices solve the problem in the current standard of how to indicate to the RNC whether data transmitted on a common E-DCH is transmitted on 2-millisecond TTI or 10-millisecond TTI. Second, these techniques enable the RNC to correctly transfer data to the upper layer and to do so in a more efficient manner. Third, these techniques enable the RNC to estimate the utilization of the 10-millisecond and 2-millisecond TTI of the common E-DCH in the cell. This would in turn enable the RNC to manage the resource utilization in a better way.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a base station of a mobile communication network, the method comprising:
   receiving a transport block from a mobile terminal, wherein said transport block is transmitted using either a 10-millisecond transmit time interval (TTI) or a 2-millisecond TTI; and
   sending, to a Radio Network Controller (RNC), an indication of whether data carried by the transport block was transmitted using the 10-millisecond TTI or the 2-millisecond TTI, wherein the indication comprises a first bit indicating that a TTI-length information element is present, and wherein the TTI-length information element comprises a second bit indicating whether the data was transmitted using the 10-millisecond TTI or the 2-millisecond TTI.

2. The method of claim 1, wherein sending the indication comprises sending the indication in a user plane frame sent over a base-station-to-RNC interface.

3. The method of claim 2, wherein sending the indication in the user plane frame comprises using at least one spare bit in an uplink data frame sent to the RNC.

4. A method, in a Radio Network Controller (RNC) of a mobile communication network, the method comprising:
   receiving data from a transport block transmitted to a base station by a mobile terminal, wherein said transport block was transmitted using either a 10-millisecond transmit time interval (TTI) or a 2-millisecond TTI; and
   receiving an indication of whether the data carried by the transport block was transmitted using the 10-millisecond TTI or the 2-millisecond TTI, wherein the indication comprises a first bit indicating that a TTI-length information element is present, and wherein the TTI-length information element comprises a second bit indicating whether the data was transmitted using the 10-millisecond TTI or the 2-millisecond TTI.

5. The method of claim 4, wherein receiving the indication comprises receiving the indication in a user plane frame sent to the RNC by another RNC, over an RNC-to-RNC interface.

6. The method of claim 4, wherein receiving the indication comprises receiving the indication in a user plane frame sent to the RNC by the base station, over a base-station-to-RNC interface.

7. The method of claim 6, wherein receiving the indication in the user plane frame comprises receiving the indication in at least one spare bit of an uplink data frame sent to the RNC.

8. The method of claim 4, further comprising
   forwarding, to a second Radio Network Controller (RNC), the indication of whether data carried by the transport block was transmitted using the 10-millisecond TTI or the 2-millisecond TTI.

9. A base station apparatus for use in a mobile communication network, the base station apparatus comprising:
   radio communications circuitry adapted to receive a transport block from a mobile terminal, wherein said transport block is transmitted using either a 10-millisecond transmit time interval (TTI) or a 2-millisecond TTI;
   an input/output interface circuit; and
   a processing circuit operatively coupled to the radio communications circuitry and the input/output interface circuit and adapted to send to a Radio Network Controller (RNC), via the input/output interface circuit, an indication of whether data carried by the transport block was transmitted using the 10-millisecond TTI or the 2-millisecond TTI, wherein the indication comprises a first bit indicating that a TTI-length information element is present, and wherein the TTI-length information element comprises a second bit indicating whether the data was transmitted using the 10-millisecond TTI or the 2-millisecond TTI.

10. The base station apparatus of claim 9, wherein the processing circuit is adapted to send the indication in a user plane frame sent over a base-station-to-RNC interface.

11. The base station apparatus of claim 10, wherein the processing circuit is adapted to send the indication in the user plane frame by using at least one spare bit in an uplink data frame sent to the RNC.

12. A Radio Network Controller (RNC) apparatus for use in a mobile communication network, the RNC apparatus comprising:
   an input/output interface circuit adapted for communications with other nodes in the mobile communication network; and
   a processing circuit operatively coupled to the input/output interface circuit and adapted to receive data from a transport block transmitted to a base station by a mobile terminal, wherein said transport block was transmitted using either a 10-millisecond or a 2-millisecond TTI;
   wherein the processing circuit is further adapted to:
     receive, via the input/output interface circuit, an indication of whether the data carried by the transport block was transmitted using the 10-millisecond TTI or the 2-millisecond TTI, wherein the indication comprises a first bit indicating that a TTI-length information element is present, and wherein the TTI-length information element comprises a second bit indicating whether the data was transmitted using the 10-millisecond TTI or the 2-millisecond TTI.

13. The RNC apparatus of claim 12, wherein the processing circuit is adapted to receive the indication in a user plane frame sent to the RNC apparatus by the base station, over a base-station-to-RNC interface.

14. The RNC apparatus of claim 12, wherein the processing circuit is adapted to receive the indication in a user plane frame sent to the RNC apparatus by another RNC, over an RNC-to-RNC interface.

15. The RNC apparatus of claim 13, wherein the processing circuit is adapted to receive the indication in at least one spare bit of an uplink data frame.

16. The RNC apparatus of claim 12, wherein the processing circuit is further adapted to forward, to a second RNC, the indication of whether data carried by the transport block was transmitted using the 10-millisecond TTI or the 2-millisecond TTI.

* * * * *

UNITED STATES PATENT AND TRADEMARK OFFICE
CERTIFICATE OF CORRECTION

PATENT NO.         : 9,100,164 B2
APPLICATION NO.    : 13/977950
DATED              : August 4, 2015
INVENTOR(S)        : Shi et al.

It is certified that error appears in the above-identified patent and that said Letters Patent is hereby corrected as shown below:

Title Page

On Page 2, in Item (56), under "OTHER PUBLICATIONS", in Column 2, Line 7, delete "2010)." and insert -- 2012). --, therefor.

Claims

In Column 12, Line 46, in Claim 12, delete "10-millisecond" and insert -- 10-millisecond transmit time interval (TTI) --, therefor.

Signed and Sealed this
Nineteenth Day of January, 2016

Michelle K. Lee
*Director of the United States Patent and Trademark Office*